United States Patent [19]

Hily et al.

[11] Patent Number: 4,735,478
[45] Date of Patent: Apr. 5, 1988

[54] OPTICAL COUPLING DEVICE FOR OPTICAL WAVEGUIDES

[75] Inventors: Claude E. Hily, Ozouer-le-Voulgis; Jean Le Bris, Quincy-sous-Senart; Jean-Pierre Cabanie, Villecresnes, all of France

[73] Assignee: U. S. Philips Corporation, New York, N.Y.

[21] Appl. No.: 5,380

[22] Filed: Jan. 12, 1987

Related U.S. Application Data

[63] Continuation of Ser. No. 586,931, Mar. 7, 1984, abandoned.

[30] Foreign Application Priority Data

Mar. 11, 1983 [FR] France ............................ 83 04042

[51] Int. Cl.$^4$ .............................................. G02B 6/28
[52] U.S. Cl. ................................ 350/96.16; 350/96.18
[58] Field of Search ............... 350/96.15, 96.16, 96.18, 350/96.19

[56] References Cited

U.S. PATENT DOCUMENTS

| | | | |
|---|---|---|---|
| 4,274,706 | 6/1981 | Tangonan | 350/96.16 |
| 4,294,508 | 10/1981 | Husbands | 350/96.15 |
| 4,474,424 | 10/1984 | Wagner | 350/96.16 |
| 4,479,697 | 10/1984 | Kapany et al. | 350/96.15 |
| 4,498,730 | 2/1985 | Tanaka et al. | 350/96.16 |

FOREIGN PATENT DOCUMENTS 148390 5/1981 German Democratic Rep. ..................... 350/96.16

Primary Examiner—Eugene R. LaRoche
Assistant Examiner—James C. Lee
Attorney, Agent, or Firm—Thomas A. Briody; Jack Oisher; William J. Streeter

[57] ABSTRACT

An optical coupling device for coupling a first optical waveguide having an end face and transmitting a number N of signals of different wavelengths with a number N of further optical waveguides having end faces and each transmitting one of these signals comprises means for the spectral selection of these signals, which means include a wavelength separator with interference filters, and means for the spatial selection of these signals in order to achieve this coupling. According to the invention all of the end faces are situated in the same plane P, said means comprise N spherical surfaces situated after each other, the (N−1) first spherical surfaces relative to the plane P being provided each with one of said interference filters the spherical surface which is remotest from the plane P being provided with either a totally reflecting or with an interference filter and the of curvature of the spherical surfaces being situated in the plane P midway the end face of the first optical waveguide and one of the end faces of the further optical waveguides.

5 Claims, 3 Drawing Sheets

OPTICAL COUPLING DEVICE FOR OPTICAL WAVEGUIDES

This is a continuation of application Ser. No. 586,931, filed Mar. 7, 1984, abandoned.

BACKGROUND OF THE INVENTION

1. Field of the Invention

The present invention relates to an optical multiplexing/demultiplexing device for coupling an end face of a first optical waveguide which transmits a number N of signals of different wavelengths with the end faces of N further optical waveguides which each transmit one of said signals, which device comprises means for spectrally separating said signals, which spectral separating means comprises a number N of wavelength selective reflective interference filters and means for spatially separating the N reflected signals.

The invention may be utilized for the multiplexing and demultiplexing of signals for telecommuniaction purposes.

2. Description of the Related Art

Such a device is disclosed in British Patent Specification No. GB 2096 350 A published on the 13th of October 1982. This Specification describes a coupling device for coupling signal-transmission elements, specifically optical fibres, which device comprises means for selecting the transmitted signals as a function of their wavelengths. These means comprise a lens and a plurality of non-parallel interference filters arranged after one another. Coupling between a fibre which transmits a plurality of signals of different wavelengths and a plurality of fibres which each transmit one signal is achieved in that the interference filters are arranged on adjacent prism faces so as to define their spacing and their orientation. The prism is a cylindrical graded-index lens by means of which each of the beams of different wavelengths can be focused on the corresponding surfaces of the selection filters.

This known device has several drawbacks. The principal drawback is that the adjustment of such a device must be effected by a displacement of the optical fibres, which are elements having dimensions of the order of one hundred microns. This adjustment is extremely critical. Another disadvantage is that the lens is a graded-index cylindrical lens. It is well-known to those skilled in the art that this element provides only an approximate focusing, because sometimes the refractive index may deviate. This gives rise to insertion losses upon coupling. Moreover, this lens must be a quarter pitch one for each of the transmission wavelengths in order to obtain the desired focusing. This means that the wavelengths used may not be spaced far from each other. Therefore, such a device cannot be used simultaneously for the two possible windows in telecommunication, i.e. the range of wavelengths between 0.8 and 1.1 μm and the range of wavelengths between 1.3 and 1.6 μm.

If the graded-index cylindrical lens is replaced by a normal lens this will not solve all the problems. In particular, this will not solve the problem of the adjustment of the device by a displacement of the optical fibres. Moreover, it will be very difficult to manufacture such a lens.

SUMMARY OF THE INVENTION

In order to overcome these problems the invention proposes a coupling device which is characterized in that all of the end faces of the waveguides are disposed in the same plane P, the means for obtaining spatial and spectral selection of the N signal wavelengths comprise N spherical surfaces situated after one another, of which the first (N−1) surfaces with respect to the plane P are respectively provided with one of said interference filters, which reflects one of the signals and transmits the other signals and of which the spherical surface which is remotest from the plane P is either totally reflecting or is an interference filter, the centres of curvatures of the spherical surfaces being situated in the plane P each midway the end face of the first optical waveguides and one of the end faces of the further optical waveguides.

A first embodiment of the invention is characterized in that each of the spherical surfaces is formed by the surface which is common to two lenses which are planoconvex and planoconcave, respectively, which lenses have a common optical axis which is perpendicular to the plane P in their antinodal points, forming the midway points the spherical surfaces of said two lenses having equal radii of curvature and being arranged against each other and one of said spherical surfaces of said two lenses being provided with one of said interference filters or the totally reflecting mirror, each pair of a planoconvex lens and a planoconcave lens forming a plate the planar surfaces of which are parallel to the plane P and all of the plates being arranged against each other, the radius of curvature of the $N^{th}$ spherical surface being given by the relationship:

$$R_N = (n/n_0 l_0 + (E_1 + E_2 + E_{N-1} + 1_N)$$

where $E_1, E_2 \ldots E_{N-1}$ are the thicknesses of the plates with parallel surfaces, $1_N$ is the thickness of the planoconvex lens of the $N^{th}$ plate measured along its optical axis, $1_o$ is the distance between the plane P and the front face of the first plate and $n_o$ the refractive index of the medium between them, and n is the refractive index of the material of the plates.

In the last-mentioned embodiment the material between the plane P and the front surface of the first pair of lenses is air.

In another embodiment the material between the plane P and the front surface of the first pair of lenses is of the same nature as that of which the lenses are made.

Now the waveguides may be stationary and adjustment is possible by a displacement, parallel to the plane P, of the various spherical reflecting surfaces.

Moreover, the device according to the invention is cheaper than the prior-art device.

Finally, the optical beams passing through the device have small inclinations relative to the optical axes of the refracting surface of device so that the end face(s) of one or more the waveguides is (are) very accurately imaged on the end face(s) of one or more of other waveguides.

BRIEF DESCRIPTION OF THE DRAWINGS

Embodiments of the invention will now be described in more detail, by way of example, with reference to the accompanying drawings, in which.

DESCRIPTION OF THE PREFERRED EMBODIMENTS

Figure 5:
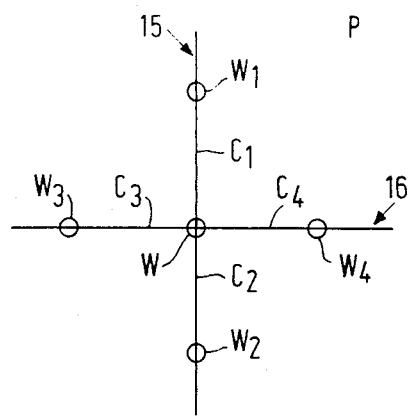
FIG. 5 shows the arrangement in a plane P of the end faces of the waveguides and the centres of curvature of the spherical surfaces.

The input or output faces of optical waveguides which are coupled by the device in accordance with the invention are shown in the same plane P in FIG. 5. In the present description of two embodiments of the invention it is assumed for the sake of clarity that one waveguide having an end face W and transmitting four signals of the wavelengths $\lambda_1, \lambda_2, \lambda_3$ and $\lambda_4$ is coupled to four waveguides having end faces $W_1, W_2, W_3, W_4$ and each transmitting one of said signals.

The end faces of the optical waveguides have small dimensions, generally of the order of one tenth of a millimeter in diameter. Therefore, these surfaces may be represented by their centres $W, W_1, W_2, W_3$ and $W_4$.

FIG. 5 shows that in accordance with the invention these end faces are disposed in the plane P. In the embodiments described here the four faces $W_1, W_2, W_3, W_4$ are arranged equidistantly around the end face W and they are disposed on the two perpendicular axes through the end face W. Thus, the end faces $W_1$ and $W_2$ are situated on the axis 15 and the end faces $W_3$ and $W_4$ are situated on the axis 16. The various waveguides all extend perpendicularly to the plane P containing their end faces.

Figure 1:
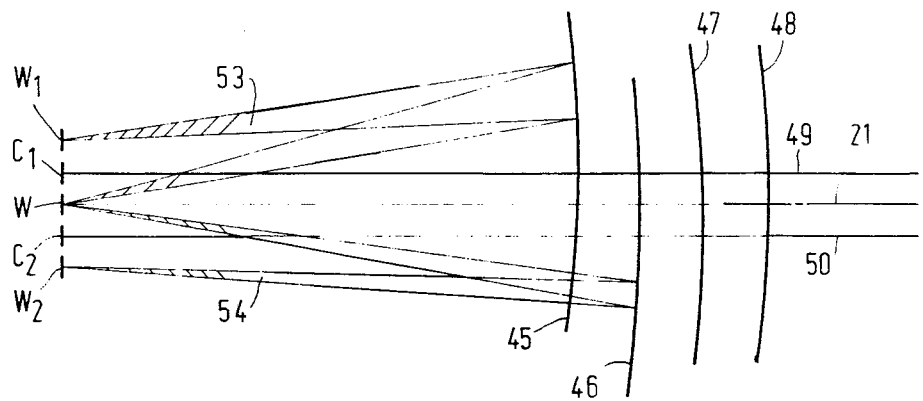
FIG. 1 is a sectional view of a device in accordance with the invention taken along a plane perpenducular to the plane of FIG. 5 and containing the axis 15.
Figure 2:
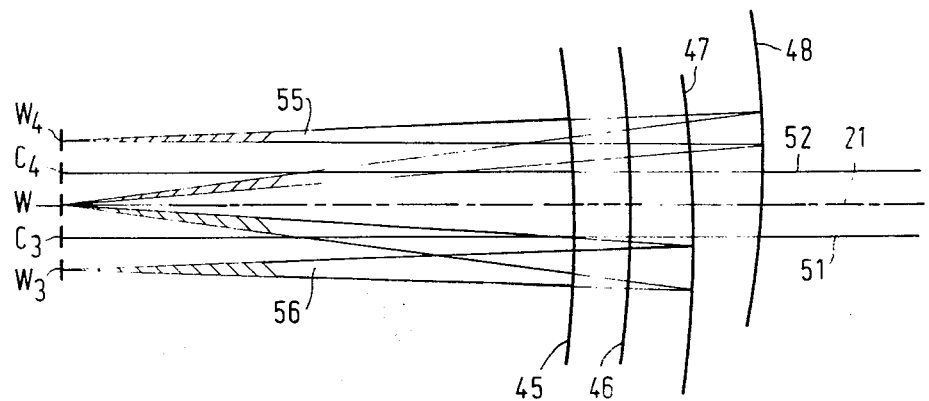
FIG. 2 is a sectional view of the same device taken along a plane perpendicular to the plane of FIG. 5 and containing the axis 16.

FIGS. 1 and 2 illustrate the operating principle of the present coupling device.

If W is the transmitting end face and $W_1, W_2, W_3$ and $W_4$ are the receiving end faces a light beam of the wavelengths $\lambda_1+\lambda_2+\lambda_3+\lambda_4$ will be incident on a first spherical surface 45 provided with an interference filter which only reflects radiation of the wavelength $\lambda_1$. As the centre of curvature of the surface 45 is point $C_1$ situated in the plane P in the centre of the segment defined by the end face W and the end face $W_1$, the radiation issuing from W and having a wavelength $\lambda_1$ is reflected from the surface 45 to the end face $W_1$. The radiation of the wavelengths $\lambda_2+\lambda_3+\lambda_4$ is transmitted and impinges on the spherical surface 46 which is provided with an interference filter which only reflects radiation of the wavelength $\lambda_2$. As the centre of curvature of the surface 46 is point $C_2$, which is situated in the plane P in the centre of the segment defined by the end face W and the end face $W_2$, radiation issuing from W and having a wavelength $\lambda_2$ will be reflected from the surface 46 to the end face $W_2$. Radiation of the wavelengths $\lambda_3+\lambda_4$ will be transmitted by the surface 46.

In a similar way radiation of the wavelength $\lambda_3$ is reflected from the end face $W_3$ by a spherical surface 47 with a centre of curvature $C_3$ situated in the plane P in the centre of the segment $WW_3$, which surface 47 is provided with an interference filter only reflects radiation of the wavelength $\lambda_3$. Finally, the radiation of the wavelength $\lambda_4$ is transmitted and impinges on a last spherical surface 48 with a centre of curvature $C_4$ situated in the centre of the segment $WW_4$. This last-mentioned surface 48 may be provided with a totally reflecting mirror. This solution has the advantage that it is less expensive. Alternatively the surface 48 may be provided with an interference filter which only reflects light rays of the wavelength $\lambda_4$ and transmits all the other wavelengths. This last-mentioned solution enables spurious radiation to be eliminated.

Conversely, if $W_1, W_2, W_3, W_4$ are the transmitting end faces this system enables the light rays issuing from these end faces to be reflected towards the end face W.

Moreover, the number of transmission wavelengths is not limited. If this number is N this requires the use of N spherical surfaces as described above. Coupling is then effected between a waveguide having an end face W and N waveguides having end faces $W_1, W_2 \ldots W_N$ which respectively transmit the wavelengths $\lambda_1, \lambda_2 \ldots \lambda_N$.

Figure 3:
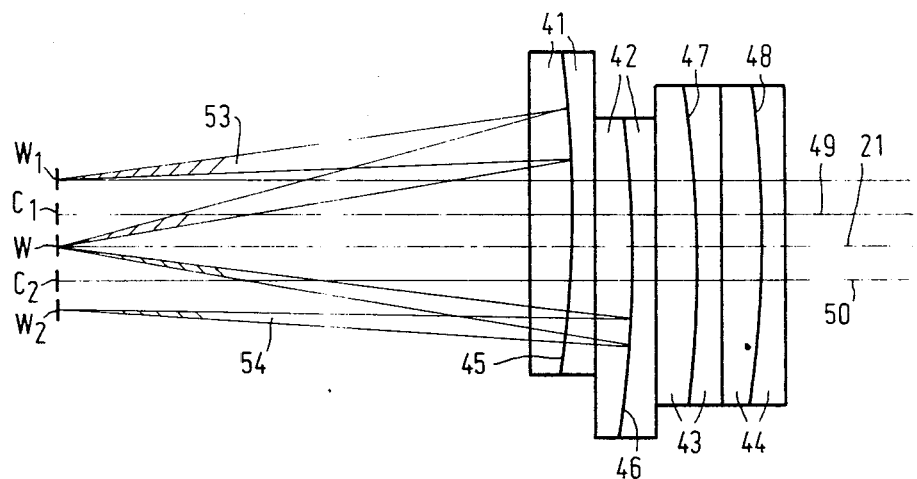
FIG. 3 is a sectional view of an embodiment of the invention taken along a plane perpendicular to the plane of FIG. 5 and containing the axis 15.
Figure 4:
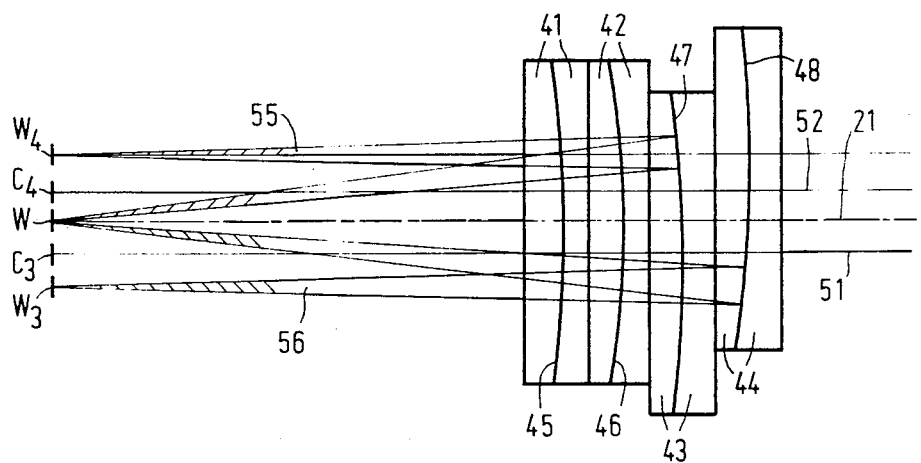
FIG. 4 is a sectional view of this embodiment taken along a plane perpendicular to the plane of FIG. 5 and containing the xis 16.

FIG. 3 shows a first embodiment of the invention in a sectional view taken on the axis 15 in the plane P and FIG. 4 is a sectional view taken along a plane perpendicular to the plane P containing the axis 16. The device comprises four pairs of lenses. Each pair comprises a planoconvex and a planoconcave lens of a transparent material, which are in contact with each other along a common spherical surface and which constitute a plate having planar faces which extend parallel to each other and to the plane P.

The spherical surface is provided with an interference filter reflecting one of the wavelengths $\lambda_1$ to $\lambda_4$ and transmitting the other wavelengths, or it is provided with a mirror which reflects the wavelengths $\lambda_1$ to $\lambda_4$. In FIGS. 3 and 4 the pairs of planoconvex and planoconcave lenses are 41, 42, 43, 44 with common spherical surfaces 45, 46, 47 and 48, respectively. The surfaces 45, 46, 47 are provided with an interference filter which reflects the wavelengths $\lambda_1, \lambda_2$ and $\lambda_3$, respectively, and which transmits the other wavelengths. The spherical surface 48 is provided with a mirror which reflects all the wavelengths $\lambda_1$ to $\lambda_4$. The optical axes of the lenses forming each plate are 49, 50, 51 and 52 and extend perpendicular to the plane P. In this plane these axes intersect the segments $WW_1, WW_2, WW_3$ and $WW_4$ at their centres $C_1, C_2, C_3$ and $C_4$, respectively. These points of intersection should coincide with the points of magnification $(-1)$, called antinodal points (which are superimposed), of the thick "mirror" lens whose thickness is that of the glass which precedes (in the direction of propagation of the light) the corresponding reflecting spherical surface. For this purpose, taking for example the radius $R_3$ of the spherical surface 47, $R_3$ must satisfy the relationship:

$$R_3=(n/n_o)l_o+(E_1+E_2+l_3) \qquad (1)$$

where $E_1$ and $E_2$ are the thicknesses of the glass plates 41 and 42 respectively, $l_3$ is the thickness of the planoconvex lens of the plate 43, $l_o$ is the thickness of the medium preceding the plate 41 and situated between the plane P and the plate 41, $l_3$ and $l_o$ both being measured along the axis 51, n is the refractive index of the material of the various plates, and $n_o$ is the refractive index of the medium preceding the plate 41. The Radii of the spherical surfaces 45, 46 and 48 must satisfy similar relationships.

In the present embodiment the points $C_1$, $C_2$, $C_3$ and $C_4$ are therefore the antinodal points of the thick lenses with the respective spherical surfaces 45, 46, 47 and 48. By these thick lenses the end face W is optically coupled to the respective end faces $W_1$, $W_2$, $W_3$ and $W_4$. Similarly, each beam issuing from $W_1$, $W_2$, $W_3$ or $W_4$, such as the beams 53, 54, 55 and 56 of the respective wavelenths $\lambda_1$, $\lambda_2$, $\lambda_3$ and $\lambda_4$ converge on the end face W and vice versa.

FIGS. 3 and 4 relate to the situation in which the medium preceding the plate 41 is air, which means that $n_o = 1$. The radius $R_3$ is then given by the relationship:

$$R_3 = n\, l_o + E_1 + E_2 + l_3 \tag{2}$$

The centres of curvature of the surfaces 45, 46, 47 and 48 are situated before the plane containing the end faces of the channels on the respective axes 49, 50, 51 and 52.

Figure 6:
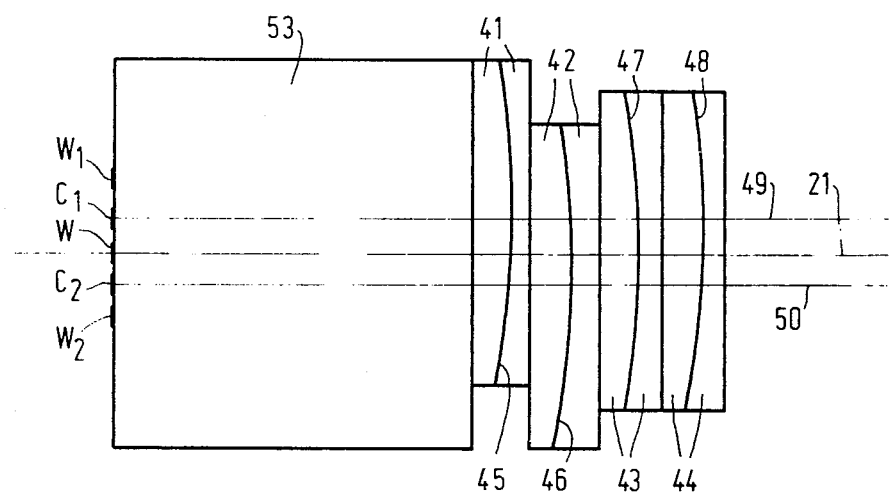
FIG. 6 is a sectional view of another version of the device taken along a plane perpendicular to the plane of FIG. 5 and containing the axis 15.

FIG. 6 is a sectional view of a modification to this embodiment, in which the medium preceding the plate 41 is constituted by the block 53 of glass having a refractive index n and being of the same type as the glass of which the various plates are made.

The radius $R_3$ is then given by the relationship:

$$R_3 = l_o + E_1 + E_3 + l_3 \tag{3}$$

As is apparent from this relationship the centre of curvature of the spherical surfaces 45 to 48 are then situated in the plane P containing the end faces of the waveguides and coinciding with the respective antinodal points $C_1$, $C_2$, $C_3$ and $C_4$ of the lenses described above. The presence of this block of glass 53 improves the quality of the image reflected by each interference filter or mirror (absence of spherical aberration at the air-glass transition at the first surface of the block 41 in FIGS. 3 and 4). Moreover, this very compact arrangement enables the use of an adaptation liquid between the glass surfaces and at the location of the entrance of the block 53, which leads to a reduction of Fresnel losses.

By way of example the varous lenses may be made of borosilicate. The interference filters are formed on this substrate by deposition of an odd number of layers which alternately have a high and a low index of refraction and which transmit the range of wavelengths under consideration. The first layer to be deposited must have a high index of refraction.

Thus, in the same example an interference filter which reflects the range of wavelengths between 0.8 and 1 μm and which transmits wavelengths outside this range can be formed by a series of 31 consecutive layers alternately made of titanium oxide ($TiO_2$) and silicon oxide ($SiO_2$), the titanium oxide being the material with a high refractive index and the silicon oxide being the material with a low refractive index.

How the thicknesses of the layers for the formation of such filters, in particular filters having a specific central wavelength, are selected is well known to those skilled in the art.

In the said example where $\lambda$ is 0.88 μm the 31 layers consecutively have the following thicknesses (H representing $TiO_2$ and B representing $SiO_2$) 0.86 $\lambda/4$(H), 0.64 $\lambda/4$(B), $\lambda/4$(H), $\lambda/4$(B), 0.98 $\lambda/4$(H), 0.97 $\lambda/4$(B), $\lambda/4$H, 0.96 $\lambda/4$(B), [$\lambda/4$(H), $\lambda/4$(B)]×7, $\lambda/4$(H), $\lambda/4$(B), $\lambda/4$(H), 0.97 $\lambda/4$(B), 0.98 $\lambda/4$(H), $\lambda/4$)B), $\lambda/4$(H), 0.64 $\lambda/4$(B), 0.86 $\lambda/4$(H).

In order to obtain interference filters which each have a different central wavelength the thickness and the number of layers merely has to be varied.

It is evident that the coupling device in accordance with the present invention presents several advantages. Its manufacture is particularly easy because it comprises only one type of means for both the spatial and the spectral selection of the beams, which means are simple semireflecting spherical surfaces. These surfaces can be obtained easily by manufacturing the optical doublets described in the foregoing. Adjustment of the system is easy because this is effected by a displacement of said lens pairs relative to each other parallel to the plane P. Indeed, it is much easier to adjust than conventional optical systems in which optical waveguides or optical fibres have to be displaced. Moreover, the present device imposes no limitation on the range of wavelengths of the signals to be transmitted.

It is obvious that various modifications may be made to the embodiments described without departing from the scope of the invention as defined by the Claims.

What is claimed is:

1. An improved optical multiplexing/demultiplexing device for coupling an end face of a first optical waveguide which transmits a plurality N of signals of different wavelengths with the end faces of N further optical waveguides which each transmit one of such signals, such device comprising means for spectrally separating said signals, such spectral separating means comprising a plurality N of interference filters respectively having a wavelength-selective reflective spherical surface and means for spatially separating the wavelengths respectively reflected by such surfaces, whereby the N signals can be multiplexed/demultiplexed between said first optical waveguide and said N further optical waveguides; such improvement being characterized in that:

the end faces of all of said optical waveguides are disposed in the same plane P;

each of said filters comprises a pair of lenses which are planoconvex and planoconcave, respectively, the curved faces of which have a common optical axis which is perpendicular to the plane P and which are in contact over a common surface which constitutes said reflective spherical surface of such filter;

each such pair of contacting planoconvex and planoconcave lenses thereby forming a plate having planar surfaces which are parallel to the plane P, such plates being arranged successively one after another with respect to the plane P, the planar surfaces of successive plates being in contact with each other; the centers of curvature of the reflective spherical surfaces of such plates being situated in the plane P and respectively located midway between the end face of said first optical waveguide and the end faces of respective ones of said further optical waveguides;

each of said plates having the same refractive index n, and the radius of curvature $R_N$ of the spherical surface of the Nth plate being given by the relationship:

$$R_N = (n/n_o)l_o + (E_1 + E_2 + E_{N-1} + l_N)$$

where $E_1, E_2 \ldots E_{N-1}$ are the thicknesses of the respective plates, $l_N$ is the thickness of the planoconcave lens of the $N^{th}$ plate measured along the optical axis thereof, $l_O$ is the distance between the plane P and the front face of the first plate, and $n_O$ is the refractive index of the medium between the plane P and the front face of the first plate.

2. A device as claimed in claim 1, characterized in that the material between the plane P and the front surface of the first plate is air.

3. A device as claimed in claim 1, characterized in that the material between the plane P and the front surface of the first plate is the same as that of which said lenses are made.

4. An optical multiplexing/demultiplexing device as claimed in claim 1, in which respective ones of said wavelength-selective reflective spherical surfaces selectively reflect respective ones of said N different wavelengths.

5. An optical multiplexing/demultiplexing device as claimed in claim 1, in which the first $N-1$ of said wavelength-selective spherical surfaces with respect to the plane P selectively reflect respective ones of said N different wavelengths, and the $N^{th}$ wavelength-selective reflective spherical surface is a totally reflecting mirror which reflects each of said N wavelengths.

* * * * *